United States Patent [19]
Yatka

[11] Patent Number: 5,466,471
[45] Date of Patent: Nov. 14, 1995

[54] CHEWING GUM CONTAINING ASPARTAME AND MALTODEXTRIN OR PURIFIED MALTODEXTRIN

[75] Inventor: Robert J. Yatka, Orland Park, Ill.

[73] Assignee: Wm. Wrigley Jr. Company, Chicago, Ill.

[21] Appl. No.: 276,251

[22] Filed: Jul. 18, 1994

[51] Int. Cl.$^6$ .................................................. A23G 3/30
[52] U.S. Cl. ............................................................. 426/3
[58] Field of Search ...................... 426/3–6, 658, 426/302

[56] References Cited

U.S. PATENT DOCUMENTS

| | | | |
|---|---|---|---|
| 4,065,578 | 12/1977 | Reggio et al. | 426/3 |
| 4,271,198 | 6/1981 | Cherukuri et al. | 426/3 |
| 4,574,091 | 3/1986 | Steensen et al. | 426/548 |
| 4,604,287 | 8/1986 | Glass et al. | 426/5 |
| 4,725,441 | 2/1988 | Porter et al. | 424/479 |
| 4,741,910 | 5/1988 | Karwowski et al. | 426/548 |
| 4,753,805 | 6/1988 | Cherukuri et al. | 426/5 |
| 4,828,841 | 5/1989 | Porter et al. | 424/479 |
| 4,927,646 | 5/1990 | Jenner et al. | 426/96 |
| 5,139,798 | 8/1992 | Yatka et al. | 426/5 |
| 5,236,719 | 8/1993 | Meyers et al. | 426/3 |
| 5,296,244 | 3/1994 | Yatka et al. | 426/3 |

FOREIGN PATENT DOCUMENTS

| | | |
|---|---|---|
| 0094088A1 | 11/1983 | European Pat. Off. . |
| 0237266A2 | 9/1987 | European Pat. Off. . |
| 0252874A2 | 1/1988 | European Pat. Off. . |
| 0335852A1 | 4/1989 | European Pat. Off. . |
| 0487187A1 | 5/1992 | European Pat. Off. . |
| 0485304A2 | 5/1992 | European Pat. Off. . |
| 0497439A1 | 8/1992 | European Pat. Off. . |
| 0545890A3 | 6/1993 | European Pat. Off. . |
| 75112 | 9/1988 | Israel . |
| 61-173748 | 8/1986 | Japan . |
| 62-146562 | 6/1987 | Japan . |
| 62-151139 | 7/1987 | Japan . |
| 62-158455 | 7/1987 | Japan . |
| 63-248348 | 10/1988 | Japan . |
| 4-60619 | 9/1992 | Japan . |
| 850209 | 1/1985 | South Africa . |
| 2013473 | 8/1979 | United Kingdom . |
| 2036750 | 7/1980 | United Kingdom . |
| WO92/09208 | 6/1992 | WIPO . |
| WO93/05663 | 4/1993 | WIPO . |
| WO93/09678 | 5/1993 | WIPO . |
| WO93/17578 | 9/1993 | WIPO . |
| WO93/17576 | 9/1993 | WIPO . |
| WO93/17579 | 9/1993 | WIPO . |
| WO93/17580 | 9/1993 | WIPO . |

*Primary Examiner*—Jeanette Hunter
*Attorney, Agent, or Firm*—Steven P. Shurtz; Willian Brinks Hofer Gilson & Lione

[57] ABSTRACT

Chewing gum products containing maltodextrin and methods of making such gum products are disclosed. In one embodiment, aspartame is used to sweeten the gum composition, and maltodextrin is provided in an amount effective to stabilize the aspartame such that after six weeks of storage at 85° F., at least 5% less aspartame decomposes than would have decomposed if the maltodextrin were not included. In another embodiment, a maltodextrin which has been purified to remove fermentable components is used in chewing gum.

20 Claims, 4 Drawing Sheets

CHEWING GUM CONTAINING ASPARTAME AND MALTODEXTRIN OR PURIFIED MALTODEXTRIN

BACKGROUND OF THE INVENTION

The present invention relates to improved compositions of chewing gum. More particularly, the invention relates to improving chewing gum by the use of specific bulking agents in sugar and non-sugar chewing gum products to give improved texture, non-cariogenic or improved shelf-life properties, including aspartame stability. The improved chewing gum compositions may also be used in a variety of chewing gum products, such as confectionery coated chewing gum products.

In recent years, efforts have been devoted to replace sugar and sugar syrups normally found in chewing gum with other carbohydrates and non-carbohydrates. Non-sugar or sugar-free chewing gum, which is growing in popularity, uses sugar alcohols or polyols to replace sugar and sugar syrups. The most popular polyols are sorbitol, mannitol and xylitol. New polyols are being developed using new technology to replace these polyols. New polyols have various unique properties which can improve the taste, texture, and shelf-life properties of chewing gum for consumers.

The non-sugar polyols have the advantage of not contributing to dental caries of consumers, as well as being able to be consumed by diabetics. However, polyols generally have the disadvantage of causing gastrointestinal disturbances if consumed in too great of a quantity. Therefore it would be a great advantage to be able to use a carbohydrate or carbohydrate-like food ingredient for chewing gum that would act as a bulking agent, but not cause gastrointestinal disturbances, and preferably that would also not contribute to dental caries.

One such bulking agent is maltodextrin, a low Dextrose Equivalent starch hydrolysate. This bulking agent is approved for use in food products in the U.S. by the USFDA. U.S. Pat. No. 4,604,287 discloses a low moisture chewing gum that contains 0.75% to 6% maltodextrin to produce a gum with an initial soft-short texture which, upon chewing, produces a soft, elastic-cohesive chewing gum.

Maltodextrin is a common encapsulating agent for flavors and high intensity sweeteners. Several patents disclose the use of maltodextrin encapsulated ingredients in chewing gum. For example, U.S. Pat. No. 5,139,798 discloses the use of a codried sucralose and maltodextrin mixed with polyvinyl acetate for use in chewing gum.

PCT Publication No. WO 93/5663 discloses the use of ingestible dextrin with aspartame (APM) in chewing gum, and shows that indigestible dextrin stabilizes APM when used at a sufficiently high level.

SUMMARY OF THE INVENTION

Unexpectedly, the combination of maltodextrin with aspartame in gum formulas containing moisture gives improved aspartame stability. Also, although maltodextrin includes low molecular weight sugars, these sugars can be removed to give a sugarless maltodextrin.

Chewing gum products containing maltodextrin and methods of making such gum products have been invented. In a first aspect of the invention, aspartame is used to sweeten the gum composition, and maltodextrin is provided in an effective amount to stabilize the aspartame such that after six weeks of storage at 85° F., at least 5% less aspartame decomposes than would have decomposed if the maltodextrin were not included.

In a second aspect, the invention is a chewing gum composition comprising from about 5% to about 95% of a gum base; about 5% to about 95% of a bulking agent; about 0.1% to about 10% of a flavor agent and a formulated amount of unencapsulated aspartame, wherein the bulking agent includes maltodextrin in amounts effective to stabilize the aspartame when the chewing gum is stored at 85° F. for at least six weeks, at least 60% of the original, formulated amount of the aspartame is recoverable, the formulated amount of aspartame being about 10% to about 50% less than the amount of the aspartame which would have been needed to recover an equal amount of aspartame in the absence of the maltodextrin stabilizer.

In a third aspect, the invention is a process for preparing and storing a chewing gum composition comprising formulating and storing a gum composition comprising from about 5% to about 95% of a gum base; about 5% to about 95% of a bulking agent; about 0.1% to about 10% of a flavor agent and a formulated, and at least partially sweetening, amount of unencapsulated aspartame, the bulking agent including, as a stabilizer for the aspartame, maltodextrin in such amounts as to stabilize the aspartame so as to allow for the recovery from the chewing gum composition of at least 75% of the formulated amount of aspartame after normal commercial storage of the chewing gum composition for at least six weeks.

In a fourth aspect, the invention is a chewing gum composition comprising about 5% to about 95% gum base, about 0.1% to about 10% of a flavoring agent, about 5% to about 95% bulking agent, the bulking agent comprising at least 10% by weight of the gum maltodextrin, and sweetening amounts of aspartame.

In a fifth aspect, a chewing gum composition comprises about 5% to about 95% gum base, about 5% to about 95% bulking agent comprising at least in part maltodextrin that is essentially free of fermentable components and about 0.1% to about 10% flavor.

DETAILED DESCRIPTION OF THE DRAWINGS AND PREFERRED EMBODIMENTS OF THE INVENTION

Figure 1:
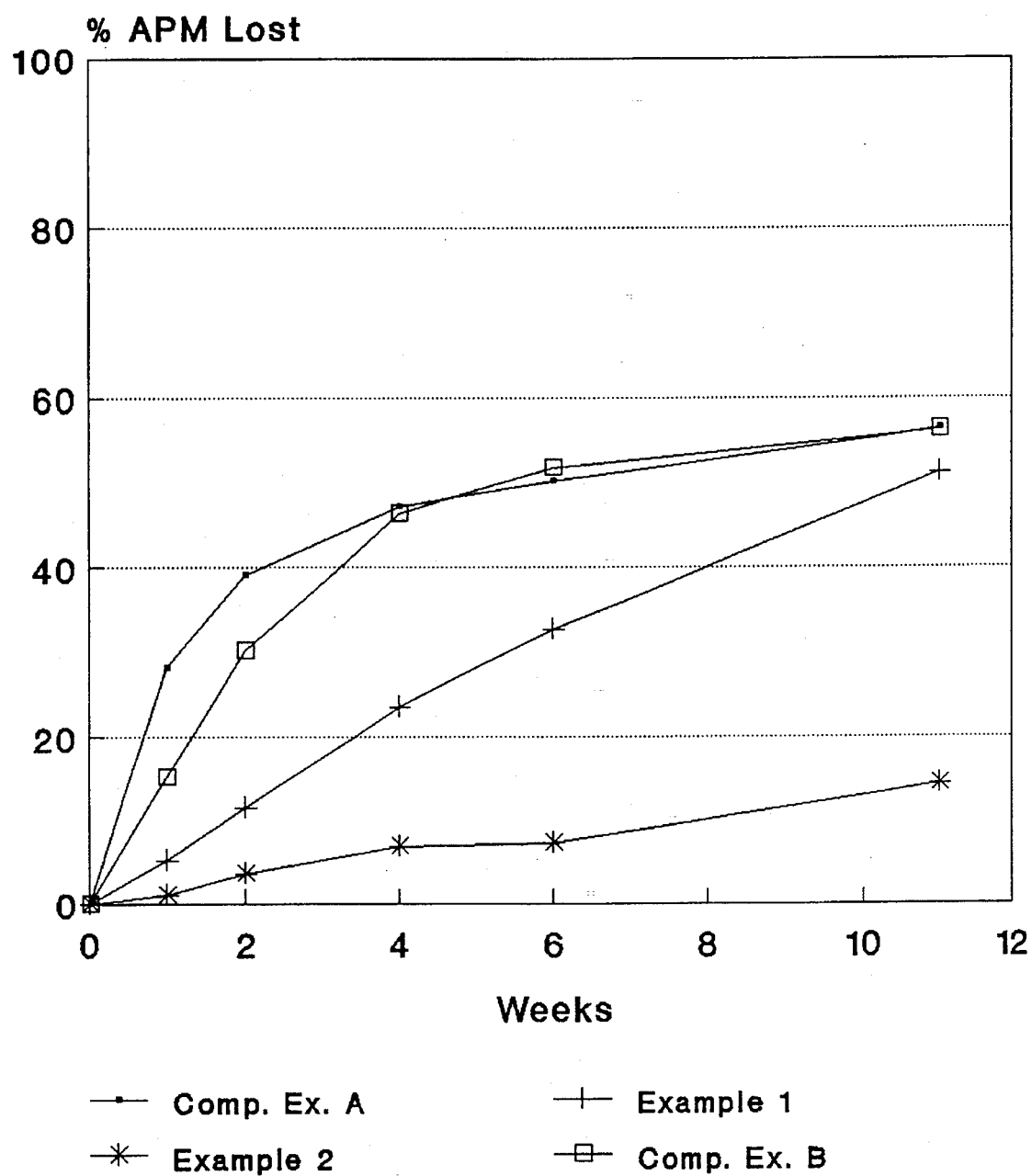
FIG. 1 shows test results of aspartame stability in gums made with sorbitol liquid and maltodextrin.

As used herein, the term "chewing gum" also includes bubble gum and the like. Unless otherwise specified, all percentages used herein are weight percents.

Maltodextrin is a carbohydrate bulking agent that is low in sweetness intensity. Typical maltodextrins are made by acid and/or enzyme hydrolysis of starches. They are hydrolyzed to a Dextrose Equivalent (D.E.) of about 4–27 and are typically spray dried to a powder. They are also readily digestible since the glucose polymer consists essentially of α-1,4 bonds between glucose molecules. For this reason, and since maltodextrin also contains some dextrose, maltose, and maltotriose (DP1, DP2, DP3), it could be considered a sugar and will cause dental caries. Thus maltodextrins may preferably be used in sugar-type gum formulations.

In order to use maltodextrins in a sugarfree gum, the maltodextrins would have to be treated to remove dextrose, maltose, and maltotriose such as by fermentation, as was disclosed for indigestible dextrin in copending application Serial No. 08/211,197, (based on PCT Publication No. WO 93/5663) and U.S. Pat. No. 5,236,719, both incorporated herein by reference. The purified maltodextrin will still remain digestible, and may be hydrolyzed by salivary alpha amylase to fermentable carbohydrates, but it could be used to give reduced dental caries by reducing plaque pH drop. Also, depending on the definition by various countries, purified maltodextrin may be considered sugarfree or carbohydrate modified.

Removal of essentially all of the fermentable components can be done by yeast fermentation, various types of chromatography, including liquid chromatography and gel permeation chromatography, ultrafiltration, and the use of glucose oxidase and maltase enzyme systems.

The yeast fermentation process is one method of eliminating fermentable components from maltodextrin. The process involves the following steps:

1) Prepare a 20% solution of maltodextrin in water and adjust the pH of the solution to 4–4.5.
2) Add 0.5% Bakers Yeast (by weight of maltodextrin) and stir constantly, at 20°–35° C. for 4–16 hours or until all the glucose and maltose are gone as analyzed by HPLC.
3) When completed, bring the solution to a boil for 5–10 minutes to inactivate the yeast.
4) Filter out the insoluble portion.
5) Evaporate, freeze dry or spray dry the filtrate.
6) Optionally, the filtrate may be decolorized by treatment with activated carbon and/or treated through an ion-exchange column to remove degraded protein and to deionize the filtrate.

Indigestible dextrin, such as Fibersol from Matsutani, is classified by the USFDA for allowance in food as a maltodextrin because it generally meets the USFDA definition of a maltodextrin. Although it may be considered a maltodextrin, it is not typical of conventional maltodextrins. Although it has a D.E. in the same range (about 4 to 27) as maltodextrin, indigestible dextrin has linkages besides the $\alpha$-1,4 bonds of maltodextrin, for example $\alpha$-1,6, $\beta$-1,2, $\beta$-1,3 and $\beta$-1,6. For purpose of the present invention, and as used in the claims, maltodextrin is defined as a saccharide polymer that consists of D-glucose units linked essentially by $\alpha$-1,4 bonds and that has a Dextrose Equivalent of between about 4 and 27. Indigestible dextrin, as disclosed in PCT Publication No. WO 93/5663, is not included in this definition of maltodextrin because the D-glucose units are connected by a substantial number of non-$\alpha$-1,4 bonds. However, indigestible dextrin and maltodextrin may together be considered as $\alpha$-D-glucose polysaccharides. As shown herein and in PCT Publication No. WO 93/5663, $\alpha$-D-glucose polysaccharides have been found to stabilize aspartame in chewing gum.

The use of maltodextrin in a chewing gum along with aspartame has been shown to offer unique advantages. When used at higher levels with aspartame, maltodextrin stabilizes aspartame in gum formulas that contain water.

Maltodextrin may be used in chewing gum as a texture and flavor modifier, bulking agent, and may improve texture, flavor and shelf-life properties in addition to aspartame stability. Maltodextrin may replace solids like sucrose, dextrose or lactose. At levels of up to about 25%, maltodextrin may replace part of the solids in sugar gum. At higher levels of about 25% to about 90% of the gum formulation, maltodextrin may replace all of the solids in a chewing gum formulation.

A sufficient quantity of maltodextrin can stabilize aspartame. Because of the lower sweetness that results from maltodextrin replacing sweeter bulking agents, aspartame may be added, generally at a level of between about 0.005% and 1% of the gum. It has been found that aspartame is stabilized with maltodextrin, especially when the maltodextrin is used at a level of about 10% or more of the gum. In preferred embodiments, an effective amount of maltodextrin is used in gums with sweetness imparting amounts of aspartame to stabilize the aspartame against decomposition during storage at 85° F. for six weeks, whereby at least 5% less aspartame decomposes into non-sweetening derivatives than would have decomposed if the maltodextrin were not included in the gum composition. Because aspartame has such high potency and is used at such low levels, and because of its high cost, even a 5% reduction in degradation is a significant benefit. Preferably the amount of aspartame formulated in the gum will be about 10% to about 50% less than the amount needed if the maltodextrin were absent. More preferably, the aspartame will be stabilized to allow a recovery of at least 75% of the formulated amount of aspartame after six weeks of storage at normal storage conditions, or so that over 60%, more preferably over 80%, of the originally formulated amount is recoverable after six weeks, more preferably eleven weeks, of storage at 85° F. While the aspartame contemplated will generally be unencapsulated, the term "unencapsulated" as used herein applies to aspartame which, even if treated or partially encapsulated, is still subject to some degradation in the gum formulation.

Recent advances use hydrogenated starch hydrolyzates (HSH) and glycerin preblended and coevaporated to reduce moisture in some sugar-free gum formulations. Maltodextrin may be used in gum formulations with hydrogenated starch hydrolyzates (HSH) without preblending with glycerin and coevaporation. Low levels of moisture are not necessary to prevent degradation of aspartame when maltodextrin is used, so HSH syrups at about 20–30% moisture do not need to be modified to reduce moisture to improve aspartame stability. In fact, the preferred gum composition of the present invention contains about 2% or more moisture.

As noted earlier, maltodextrin is often used as an encapsulating or agglomerating agent. Maltodextrin may also be used to absorb other ingredients. Maltodextrin may be able to encapsulate, agglomerate or entrap/absorb flavors and high-intensity sweeteners like aspartame, alitame, cyclamic acid and its salts, saccharin acid and its salts, acesulfame and its salts, sucralose, dihydrochalcones, thaumatin, monellin or combinations thereof. Encapsulation of high-intensity sweeteners with maltodextrin may improve the sweetener's shelf-life. These encapsulated flavors and/or sweeteners may be added to chewing gum. It is believed that the maltodextrin used in such encapsulations, when combined with a sufficient amount of unbound maltodextrin, will improve aspartame stability. However, in the preferred embodiment, all of the maltodextrin added to provide stability is in a form where it is not bound with any other gum ingredient.

The previously described maltodextrin bulk sweetener may readily be incorporated into a chewing gum composition, preferably at a level of about 10% to about 60%, and more preferably about 15% to about 40%, of the gum compositions. The maltodextrin will have a D.E. in the range of 4–27, more preferably 7–24 and most preferable 10–17. The remainder of the chewing gum ingredients are noncritical to the present invention. That is, the bulk sweetener can be incorporated into conventional chewing gum formulations in a conventional manner. The maltodextrin bulk sweeteners may be used in a sugar-free or sugar chewing gum to modify the sweetness thereof. The bulk sweetener may be used in either regular chewing gum or bubble gum. Higher levels of maltodextrin will reduce sweetness, thus allowing for its use in non-sweet flavored chewing gums, such as snack flavors or savory flavors.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinyl acetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95% of the gum. More preferably the insoluble gum base comprises between 10 and 50% of the gum and most preferably about 20 to about 35% of the gum.

The gum base typically also includes a filler component. The filler component may be calcium carbonate, magnesium carbonate, talc, dicalcium phosphate or the like. The filler may constitute between about 5 and about 60% of the gum base. Preferably, the filler comprises about 5 to about 50% of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. The sweeteners often fill the role of bulking agents in the gum. The bulking agents generally comprise from about 5% to about 95%, preferably from about 20% to about 80%, and most preferably from about 30% to about 60% of the gum.

Softeners are added to the chewing gum in order to optimize the chewability and mouth feel of the gum. Softeners, also known in the art as plasticizers or plasticizing agents, generally constitute between about 0.5 to about 15% of the chewing gum. Softeners contemplated by the present invention include glycerin, lecithin and combinations thereof. Further, aqueous sweetener solutions such as those containing sorbitol, hydrogenated starch hydrolyzates, corn syrup and combinations thereof may be used as softeners and binding agents in gum.

As mentioned above, the maltodextrin bulk sweetener of the present invention may be used in sugar gum formulations. However, sugar-free formulations are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The maltodextrin bulk sweetener of the present invention can also be used with aspartame in combination with other high-intensity sweeteners, as well as commonly known sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolyzates, maltitol and the like, alone or in any combination.

Depending on the particular sweetness release profile and shelf-stability needed, the maltodextrin of the present invention can also be used in combination with coated or uncoated high-intensity sweeteners, such as acesulfame K, or the salts of acesulfame, cyclamate and its salts, saccharin and its salts, alitame, sucralose, thaumatin, monellin, dihydrochalcones, stevioside, glycyrrhizin and combinations thereof.

High-intensity sweeteners may also be modified to control their release in chewing gum formulations containing maltodextrin. This can be controlled by various methods of encapsulation, agglomeration, absorption, or a combination of methods to obtain either a fast or slow release of the sweetener. Sweetener combinations, some of which may be synergistic, may also be included in the gum formulations containing maltodextrin.

A flavoring agent may be present in the chewing gum in an amount within the range of from about 0.1 to about 10%, and preferably from about 0.5 to about 3% of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with any syrup and a portion of the bulking agent/sweetener. Further portions of the bulking agent/sweetener may then be added to the mixer. A flavoring agent is typically added with the final portion of the bulking agent. Aspartame, with or without other high-intensity sweeteners, is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

Although it is preferable to use maltodextrin in a sugar gum, and a purified maltodextrin in a sugarless gum formulation, either may be used in a gum formula at levels sufficient to stabilize aspartame. To demonstrate APM stability, sugarless gum formulas were made with a 15 D.E. maltodextrin called MALTRIN M150 from Grain Processing Co. of Muscatine, Iowa. The following examples were made:

COMPARATIVE EXAMPLES A–B AND EXAMPLES 1–2

|  | Comparative Ex. A | Comparative Ex. B | Ex. 1 | Ex. 2 |
|---|---|---|---|---|
| Base | 24.7 | 24.7 | 24.7 | 24.7 |
| Sorbitol | 50.0 | 45.0 | 35.0 | 10.0 |
| Mannitol | 9.4 | 9.4 | 9.4 | 9.4 |
| Glycerin | 2.0 | 2.0 | 2.0 | 2.0 |
| Peppermint Flavor | 1.4 | 1.4 | 1.4 | 1.4 |
| Lecithin | 0.2 | 0.2 | 0.2 | 0.2 |
| Liquid Sorbitol* | 12.0 | 12.0 | 12.0 | 12.0 |
| Aspartame | 0.3 | 0.3 | 0.3 | 0.3 |
| Maltodextrin | — | 5.0 | 15.0 | 40.0 |
| | 100.0 | 100.0 | 100.0 | 100.0 |

*70% Sorbitol Solids/30% Water

These formulas were made in a conventional lab mixer in a conventional manner and formed into pellets. Samples of each formula were placed in six sealed pouches and stored at 85° F. for 0, 1, 2, 4, 6 and 11 weeks. Samples were then removed and analyzed for APM to determine degradation. The test results are shown in FIG. 1. Results show improved APM stability for gums with 15% and 40% maltodextrin. As seen in FIG. 1, after six weeks of storage at 85° F., over 60% of the originally formulated amount of aspartame remained undecomposed in the gum formulas that included 15% or more maltodextrin, and over 80% of the originally formulated amount of aspartame remained undecomposed after 11 weeks of storage for the gum formula that included 40% maltodextrin.

As seen in FIG. 1, where a direct comparison can be made between samples with and without maltodextrin, the maltodextrin at a level of 15% and 40% was effective to stabilize the aspartame such that after six weeks of storage, about 38% and 84%, respectively, less aspartame decomposed than decomposed where the maltodextrin was not included in the gum. In fact, the formulated amount of aspartame could have been reduced about 27% and about 45% respectively and an equal amount of aspartame could have been recovered compared to the formula where maltodextrin was not added.

COMPARATIVE EXAMPLE C AND EXAMPLES 3–4

|  | Comparative Ex. C | Ex. 3 | Ex. 4 |
|---|---|---|---|
| Base | 24.7 | 24.7 | 24.7 |
| Sorbitol | 50.0 | 35.0 | 10.0 |
| Mannitol | 7.0 | 7.0 | 7.0 |
| Glycerin | 2.0 | 2.0 | 2.0 |
| Lecithin | 0.2 | 0.2 | 0.2 |
| Peppermint Flavor | 1.4 | 1.4 | 1.4 |
| Lycasin HSH* | 14.4 | 14.4 | 14.4 |
| Aspartame | 0.3 | 0.3 | 0.3 |
| Maltodextrin | — | 15.0 | 40.0 |
| | 100.0 | 100.0 | 100.0 |

*75% HSH Solids/25% Water

Figure 2:
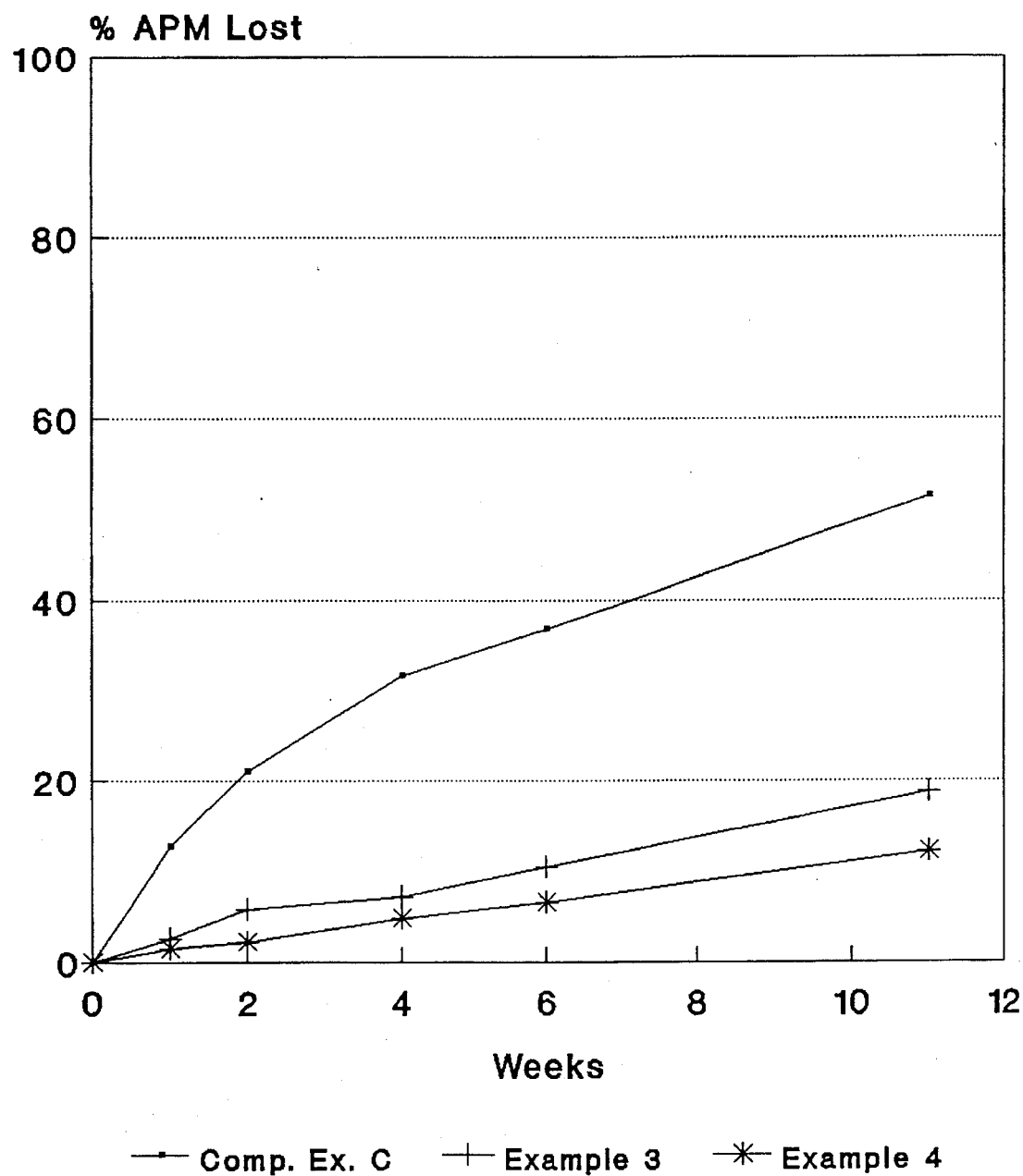
FIG. 2 shows test results of aspartame stability in gums made using Lycasin brand HSH syrup and maltodextrin.

These formulas were made in a conventional lab mixer in a conventional manner and formed into pellets. Samples of each formula were placed in six sealed pouches and stored at 85° F. for 0, 1, 2, 4, 6 and 11 weeks. Samples were then removed and analyzed for APM to determine degradation. The test results, shown in FIG. 2, demonstrate that at 15% maltodextrin, over 80% of the original aspartame was still available after 11 weeks of storage, and at 40% maltodextrin, about 90% of the original aspartame was still available after 11 weeks of storage.

COMPARATIVE EXAMPLES D–G AND EXAMPLES 5–8

|  | Comparative Ex. D | Ex. 5 | Comparative Ex. E | Ex. 6 |
|---|---|---|---|---|
| Base | 24.7 | 24.7 | 24.7 | 24.7 |
| Sorbitol | 50.0 | 35.0 | 50.0 | 35.0 |
| Mannitol | 9.4 | 9.4 | 9.4 | 9.4 |
| Glycerin | 2.0 | 2.0 | 5.0 | 5.0 |
| Peppermint Flavor | 1.4 | 1.4 | 1.4 | 1.4 |
| Lecithin | 0.2 | 0.2 | 0.2 | 0.2 |
| Liquid Sorbitol* | 12.0 | 12.0 | 9.0 | 9.0 |
| Aspartame | 0.3 | 0.3 | 0.3 | 0.3 |
| Maltodextrin | — | 15.0 | — | 15.0 |
| | 100.0 | 100.0 | 100.0 | 100.0 |

*70% Sorbitol Solids/30% Water

|  | Comparative Ex. F | Ex. 7 | Comparative Ex. G | Ex. 8 |
|---|---|---|---|---|
| Base | 24.7 | 24.7 | 24.7 | 24.7 |
| Sorbitol | 50.0 | 35.0 | 50.0 | 35.0 |
| Mannitol | 9.4 | 9.4 | 9.4 | 9.4 |
| Glycerin | 8.0 | 8.0 | 11.0 | 11.0 |
| Peppermint Flavor | 1.4 | 1.4 | 1.4 | 1.4 |
| Lecithin | 0.2 | 0.2 | 0.2 | 0.2 |
| Liquid Sorbitol* | 6.0 | 6.0 | 3.0 | 3.0 |
| Aspartame | 0.3 | 0.3 | 0.3 | 0.3 |
| Maltodextrin | — | 15.0 | — | 15.0 |
| | 100.0 | 100.0 | 100.0 | 100.0 |

*70% Sorbitol Solids/30% Water

Figure 3:
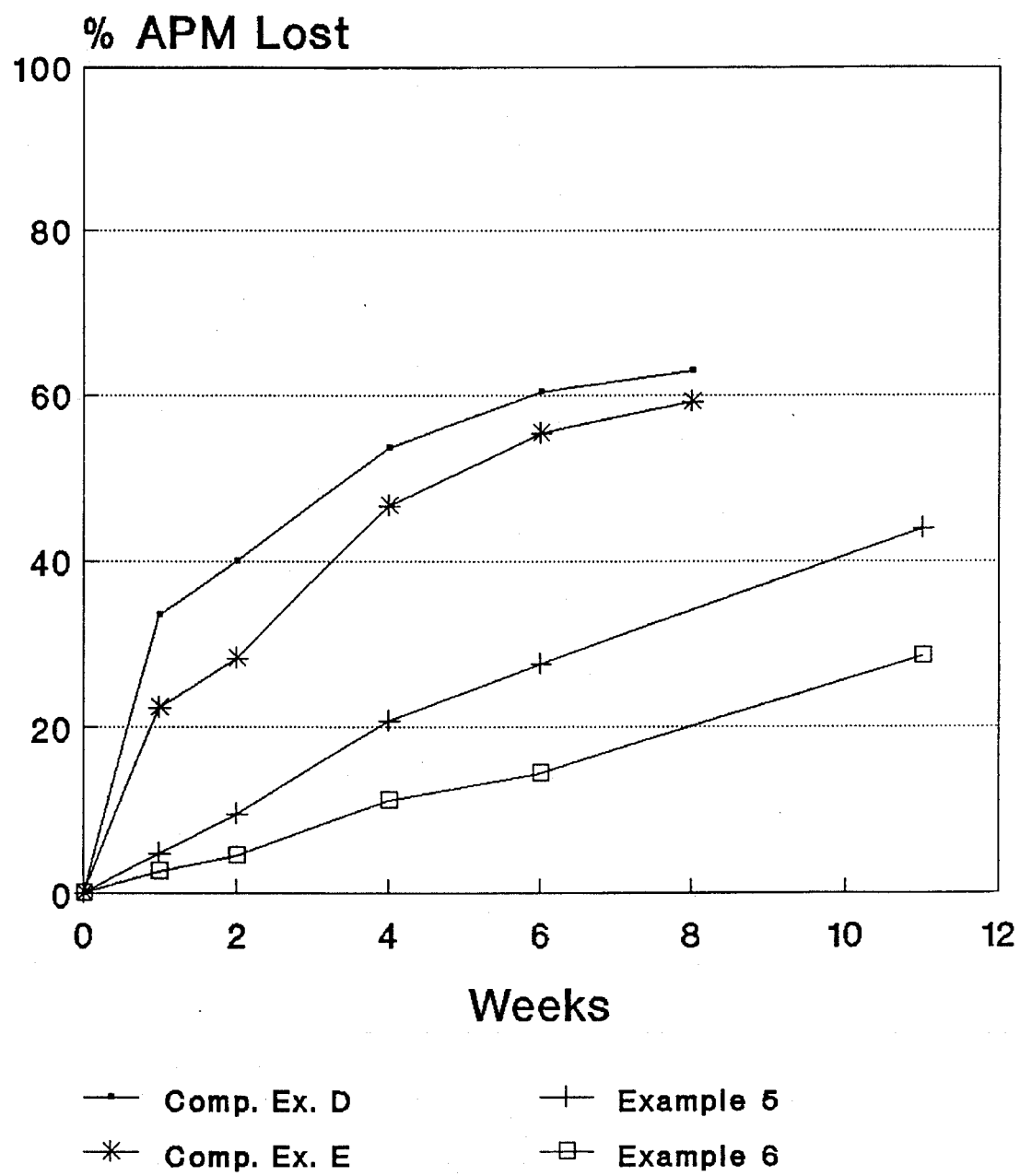
FIG. 3 shows test results of aspartame stability in gums made using high levels of liquid sorbitol and maltodextrin.
Figure 4:
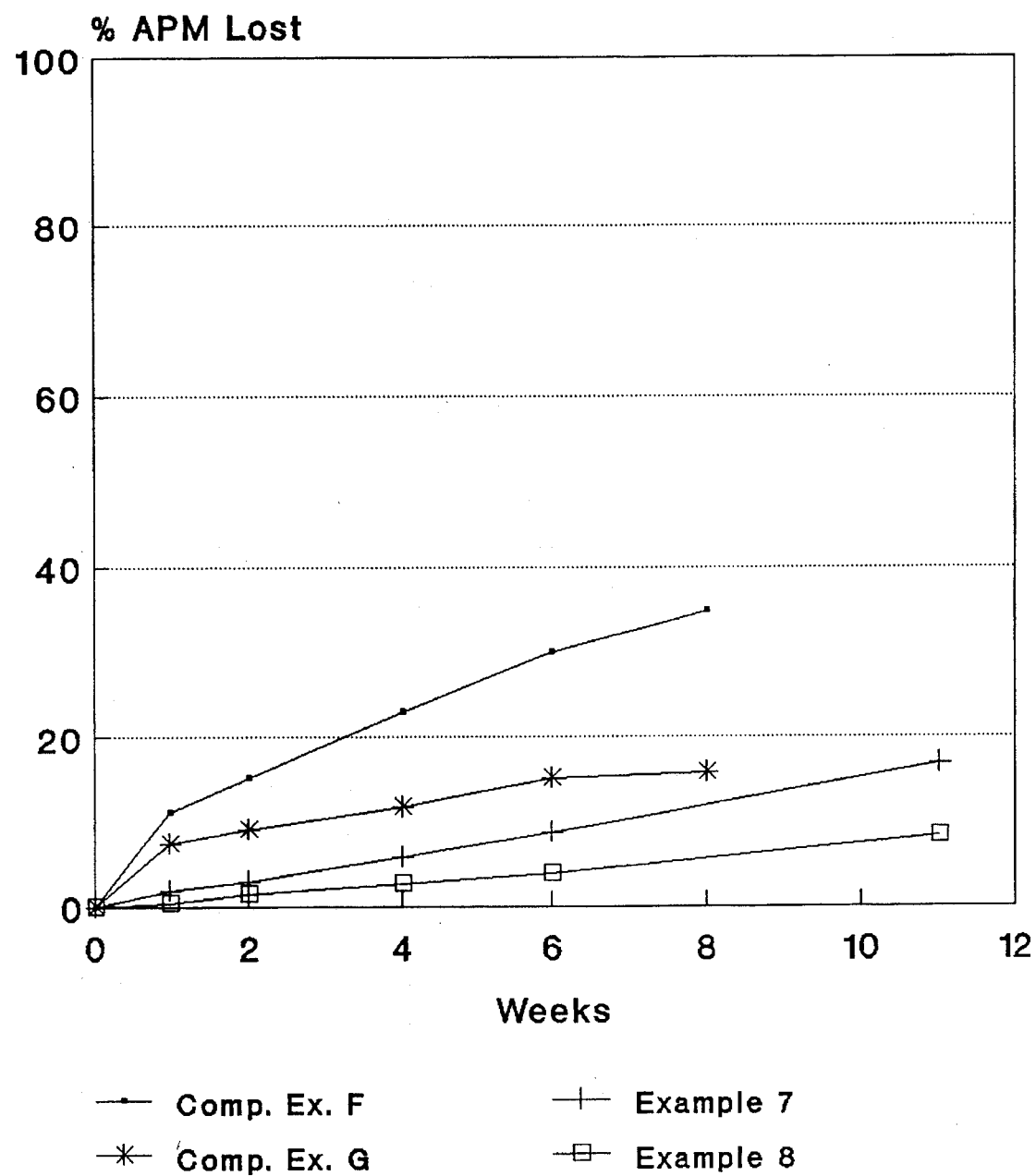
FIG. 4 shows test results of aspartame stability in gums made with low levels of sorbitol liquid and maltodextrin.

These samples were prepared and evaluated similar to Comparative Examples A–B and Examples 1–2 except that Comparative Examples D, E, F, and G were stored at 85° F. for 0, 1, 2, 4, 6 and 8 weeks, whereas, Examples 5, 6, 7 and 8 were stored at 85° F. for 0, 1, 2, 4, 6 and 11 weeks. Samples were analyzed for APM degradation and results are shown in FIGS. 3 and 4.

As can be seen from the data, generally gum samples with less moisture show improved APM stability. With the use of maltodextrin, APM stability is improved still further at high or low moisture levels of gum.

A possible explanation for improved APM stability is that maltodextrins may have an affinity for water in the gum formula, which thereby does not make moisture available to allow it to degrade APM.

It should be appreciated that the compositions and methods of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included may have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention, therefore, is indicated by the appended claims rather than by the foregoing description. All changes which come within the meaning and range of equivalency of the claims are to be embraced within their scope.

I claim:

1. A chewing gum composition comprising sweetness imparting amounts of unencapsulated aspartame and an effective amount of maltodextrin to stabilize said aspartame against decomposition during storage at 85° F. for six weeks whereby at least 5% less aspartame decomposes into non-sweetening derivatives that would have decomposed if the maltodextrin were not included in the gum composition.

2. The chewing gum composition of claim 1 wherein the gum composition comprises at least 10% maltodextrin.

3. The chewing gum composition of claim 1 wherein the gum composition comprises about 0.005% to about 1% unencapsulated aspartame.

4. The chewing gum composition of claim 1 wherein the maltodextrin is effective such that after six weeks of storage at 85° F., over 80% of the unencapsulated aspartame originally formulated in the gum composition remains undecomposed.

5. A chewing gum composition comprising from about 5% to about 95% of a gum base; about 5% to about 95% of a bulking agent; about 0.1% to about 10% of a flavor agent and a formulated amount of unencapsulated aspartame wherein the bulking agent includes maltodextrin in amounts effective to stabilize said aspartame when said chewing gum is stored at 85° F. for at least six weeks, at least 60% of the original, formulated amount of said aspartame is recoverable, said formulated amount of aspartame being about 10% to about 50% less than the amount of said aspartame which would have been needed to recover an equal amount of aspartame in the absence of the maltodextrin stabilizer.

6. The chewing gum composition of claim 5 wherein the amount of maltodextrin employed is between about 10% and 60% of the composition.

7. The chewing gum composition of claim 5 wherein the formulated amount of aspartame comprises between about 0.005% and about 1% of the composition.

8. A process for preparing and storing a chewing gum composition comprising formulating and storing a gum composition comprising from about 5% to about 95% of a gum base; about 5% to about 95% of a bulking agent; about 0.1% to about 10% of a flavor agent and a formulated, and at least partially sweetening, amount of unencapsulated aspartame, the bulking agent including, as a stabilizer for said aspartame, maltodextrin in such amounts as to stabilize said aspartame so as to allow for the recovery from said chewing gum composition of at least 75% of said formulated amount of aspartame after normal commercial storage of said chewing gum composition for at least six weeks.

9. A process for reducing the amount of unencapsulated aspartame needed to be formulated into a chewing gum product comprising from about 5% to about 95% of a gum base; about 5% to about 95% of a bulking agent; and about 0.1% to about 10% of a flavor agent, wherein the gum product is at least partially sweetened therewith, and while still providing for a recoverable aspartame content of X % after the ambient commercial storage of said chewing gum product for at least six weeks, said X % being at least 20% of the reduced amount of said aspartame to be formulated into said chewing gum product, which comprises:
formulating said chewing gum product with an amount of aspartame which is about 10 to 50% less than the amount of aspartame which would have been needed in said chewing gum product, in the absence of a stabilizer for said aspartame, to provide for a recoverable level of X % of aspartame after said storage period, and with, as a stabilizer for such reduced amount of aspartame, maltodextrin in such amounts as to effectively stabilize said aspartame and provide for a recoverable aspartame content of X % after said storage period.

10. A chewing gum composition comprising from about 5% to about 95% of a gum base; about 5% to about 95% of a bulking agent; about 0.1% to about 10% of a flavor agent and an admixture of a) about 0.005% to about 1% of unencapsulated aspartame, and b) the bulking agent comprising maltodextrin in an amount effective to stabilize said aspartame when said chewing gum composition is stored at 85° F. for at least six weeks so that at least 60% of said (a) amount of aspartame is then recoverable.

11. The chewing gum composition of claim 10 wherein the chewing gum comprises:

a) about 20% to about 35% gum base; and b) about 10% to about 60% maltodextrin.

12. The chewing gum composition of claim 10 wherein after six weeks of storage over 80% of the original aspartame is recoverable.

13. A chewing gum composition comprising:

a) about 5% to about 95% gum base;

b) about 0.1% to about 10% of a flavoring agent, c) about 5% to about 95% bulking agent, the bulking agent comprising at least 10%, by weight of the gum, maltodextrin, and d) sweetening amounts of aspartame.

14. The chewing gum composition of claim 13 wherein the chewing gum composition has a moisture content of at least about 2%.

15. The chewing gum composition of claim 13 wherein the maltodextrin is freely admixed into the composition and is not bound with any other gum ingredient.

16. The chewing gum composition of claim 13 wherein the maltodextrin has a D.E. of between about 4 and about 27.

17. A chewing gum composition comprising:

a) about 5% to about 95% gum base;

b) about 5% to about 95% bulking agent comprising at least in part maltodextrin that is essentially free of fermentable components; and c) about 0.1% to about 10% flavor.

18. The chewing gum composition of claim 17 wherein the composition has reduced cariogenicity.

19. A method of making a chewing gum composition comprising the steps of:

a) providing about 5% to about 95% of a gum base;

b) providing about 5% to about 95% of a bulking agent comprising at least in part maltodextrin that is essentially free of fermentable components;

c) providing about 0.1% to about 10% flavor; and d) mixing the gum base, bulking agent and flavor to make a chewing gum composition.

20. The method of claim 19 wherein the composition has reduced cariogenicity.

* * * * *